(12) United States Patent  (10) Patent No.: US 8,222,609 B2
Takeda et al.  (45) Date of Patent: Jul. 17, 2012

(54) IMAGE PICKUP APPARATUS, RADIATION IMAGE PICKUP APPARATUS, AND METHOD FOR MANUFACTURING SAME

(75) Inventors: Shinichi Takeda, Honjo (JP); Satoshi Okada, Zama (JP); Masato Inoue, Kumagaya (JP); Kazumi Nagano, Fujisawa (JP); Keiichi Nomura, Honjo (JP); Satoru Sawada, Kodama-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 12/638,659

(22) Filed: Dec. 15, 2009

(65) Prior Publication Data

US 2010/0155612 A1  Jun. 24, 2010

(30) Foreign Application Priority Data

Dec. 19, 2008  (JP) .................................. 2008-324401

(51) Int. Cl.
    *H01L 27/146* (2006.01)
(52) U.S. Cl. ................................................. 250/370.08
(58) Field of Classification Search ............ 250/370.01–370.15; 378/98.8
    See application file for complete search history.

(56) References Cited

U.S. PATENT DOCUMENTS

| 7,332,218 | B1 | 2/2008 | Gilbert |
| 2002/0038851 | A1 | 4/2002 | Kajiwara |
| 2002/0195568 | A1* | 12/2002 | Mori et al. ............... 250/370.11 |
| 2003/0001101 | A1* | 1/2003 | Homme et al. .......... 250/370.11 |
| 2003/0058998 | A1* | 3/2003 | Aufrichtig et al. ............. 378/207 |

FOREIGN PATENT DOCUMENTS

JP  63061178 A  *  3/1988

* cited by examiner

*Primary Examiner* — Kiho Kim
(74) *Attorney, Agent, or Firm* — Canon USA Inc. IP Division

(57) ABSTRACT

An image pickup apparatus includes a base that has electric conductivity, at least one image pickup element, and at least one fixing member for fixing the image pickup element to the base. The base has at least one conducting portion on the surface thereof on the side of the fixing member, and the image pickup element has a conducting portion on the surface thereof on the side of the fixing member. The fixing member is formed of peelable resin for separating the image pickup element from the base by applying current. The area of the conducting portion of the base is larger than the area of the fixing region between the fixing member and the base.

16 Claims, 10 Drawing Sheets

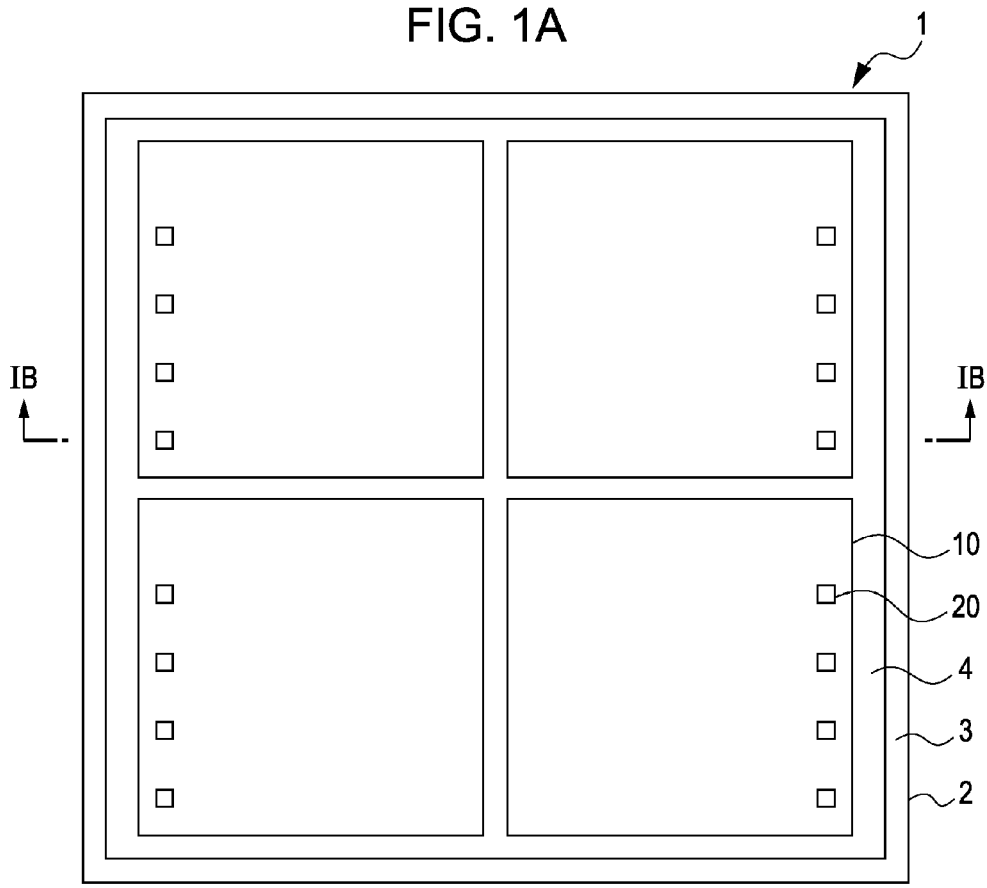
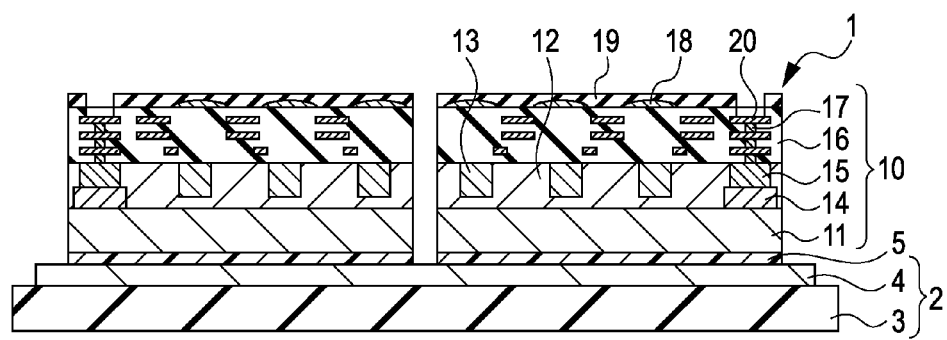

IMAGE PICKUP APPARATUS, RADIATION IMAGE PICKUP APPARATUS, AND METHOD FOR MANUFACTURING SAME

BACKGROUND OF THE INVENTION

1. Field of the Invention

The present invention relates to an image pickup apparatus that detects light or radiation and a method for manufacturing the same, and more specifically, it relates to a radiation image pickup apparatus used, for example, as a medical diagnostic imaging apparatus, a nondestructive inspection apparatus, or an analyzing apparatus.

2. Description of the Related Art

Single crystal semiconductor wafers in circulation now are small compared to glass substrates. Therefore, in order to make a large-area detector out of single crystal semiconductor wafers, single crystal semiconductor wafers on which detector elements are formed are divided into a plurality of image pickup element chips, and the image pickup element chips are arranged so as to form a detector having a desired area.

U.S. Patent Application Publication No. US 2002/0038851 describes inspecting image pickup element chips before bonding the image pickup element chips to a base substrate that is part of an apparatus, and replacing defective chips, if any, in order to reduce cost. After the inspection and replacement, the image pickup element chips are bonded to the base substrate.

U.S. Pat. No. 7,332,218 describes an adhesive that is an electrochemically disbondable composition that can be used as adhesive bond and coating in various applications where a substance is desirably easily removed from a surface.

However, in the case of the method of U.S. Patent Application Publication No. US 2002/0038851, it is difficult to replace only defective image pickup element chips after bonding a plurality of image pickup element chips to a base. For example, if some image pickup element chips are destroyed by electrostatic charge when image pickup element chips are detached from a vacuum apparatus, the destroyed image pickup element chips are difficult to replace. At the time of replacement, other normal image pickup element chips can be destroyed.

Although U.S. Pat. No. 7,332,218 describes an adhesive that is an electrochemically disbondable composition, a specific configuration or method for facilitating the replacement of image pickup element chips using this adhesive is required.

SUMMARY OF THE INVENTION

The present invention provides an image pickup apparatus having easily replaceable image pickup elements.

In an aspect of the present invention, an image pickup apparatus includes a base that has electric conductivity, an image pickup element, and a fixing member fixing the image pickup element to the base. The base has a conducting portion on the surface thereof on the side of the fixing member, and the image pickup element has a conducting portion on the surface thereof on the side of the fixing member. The fixing member is formed of peelable resin for separating the image pickup element from the base by applying current. The area of the conducting portion of the base is larger than the area of the fixing region between the fixing member and the base.

In another aspect of the present invention, a radiation image pickup apparatus includes a base that has electric conductivity, a scintillator panel on which light is incident and that emits light, an image pickup element, and a fixing member fixing the image pickup element to the base. The fixing member is formed of peelable resin for separating the image pickup element from the base by applying current.

In another aspect of the present invention, a method for manufacturing an image pickup apparatus includes the steps of: preparing a base that has electric conductivity; preparing an image pickup element; inspecting the image pickup element; applying peelable resin for separating adherend by applying current to the base or the image pickup element; fixing the image pickup element to the base with the peelable resin therebetween; inspecting the image pickup element fixed to the base; and if the image pickup element is determined to be defective in the inspecting step, applying a voltage between the base and the defective image pickup element and peeling the defective image pickup element from the base.

In another aspect of the present invention, a method for manufacturing a radiation image pickup apparatus includes the steps of: preparing a base that has electric conductivity; preparing an image pickup element; inspecting the image pickup element; applying peelable resin for separating adherend by applying current, to the base or the image pickup element; fixing the image pickup element to the base with the peelable resin therebetween; inspecting the image pickup element fixed to the base; if the image pickup element is determined to be defective in the inspecting step, applying a voltage between the base and the defective image pickup element and peeling the defective image pickup element from the base; and disposing a scintillator on the image pickup element.

Further features of the present invention will become apparent from the following description of exemplary embodiments with reference to the attached drawings.

BRIEF DESCRIPTION OF THE DRAWINGS

FIGS. 1A and 1B are a plan view and a sectional view, respectively, showing an image pickup apparatus according to an embodiment of the present invention.

DESCRIPTION OF THE EMBODIMENTS

Figure 2A:
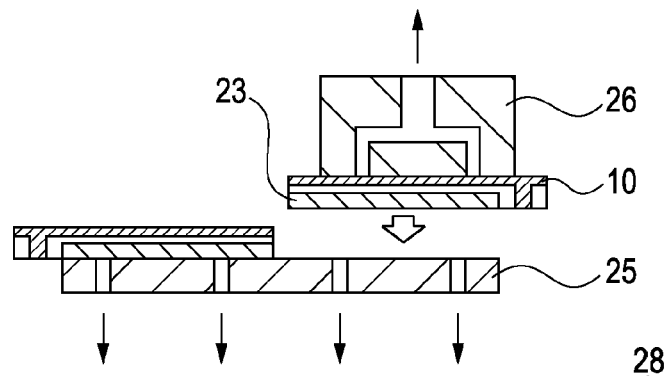
FIGS. 2A to 2E are sectional views showing a method for manufacturing an image pickup apparatus according to an embodiment of the present invention.

The embodiments of the present invention will now be described with reference to the drawings. In the present invention, light includes visible light and infrared light, and radiation includes X-rays, alpha rays, beta rays, and gamma rays.

FIGS. 1A and 1B show an image pickup apparatus according to a first embodiment. FIG. 1A is a plan view of the image pickup apparatus, and FIG. 1B is a sectional view of the image pickup apparatus taken along line IB-IB of FIG. 1A.

As shown in FIGS. 1A and 1B, the image pickup apparatus 1 has a base 2 and four image pickup elements 10 on the base 2. Between the base 2 and each image pickup element 10, a fixing member 5 is disposed. The four image pickup elements 10 are disposed at a distance from each other on the base 2 to reduce the electrical and mechanical impact in case of contact between the image pickup elements 10. The number of image pickup elements 10 fixed to the base 2 is not limited to four. One or more image pickup elements 10 may be disposed. The base 2 is composed of an insulating plate 3 and a conducting portion 4. The surface of the base 2 on the side of the image pickup elements 10 has electric conductivity. The base 2 may be made of a conductive resin or a metal. Alternatively, the base 2 may be a conductive base composed of an insulating substrate and a conducting portion provided thereon. Conductive resins include polystyrene-, nylon-, and fluorine-based conductive resins. Metals include aluminum, stainless steel, molybdenum, iron, and alloys of these. Alternatively, a carbon substrate may serve as the base 2. The insulating plate 3 is made, for example, of resin, ceramic, or glass. The conducting portion 4 is a thin film, for example, of aluminum, molybdenum, or an alloy of these formed, for example, by printing, adhesive bonding, stamping, PVD (Physical Vapor Deposition), or CVD (Chemical Vapor Deposition). In the cases of PVD and CVD, to form the conducting portion 4 into a desired shape, a mask is used in the deposition of a thin film or the etching after the deposition of a thin film. As shown in FIG. 1A, at least a part of the conducting portion 4 of the base 2 is desirably exposed as viewed from the side of the image pickup elements 10. The reason is that, in a peeling step to be described, a probe for applying a voltage can be easily brought into contact with the conducting portion 4. The fixing members 5 are formed of a peelable resin containing an electrically disbonding material. After a voltage is applied and a current flows between an adherend and the peelable resin, the adherend can be separated from the peelable resin. This separation is performed by the oxidation-reduction reaction of ionically solvating molecules having ionic conductivity. The peelable resin that forms the fixing members 5 contains a polymer for adhesion, such as epoxy, phenolic resin, acrylic resin, melamine, maleimide, or polyurethane, and an electrolyte for peeling. The electrolyte for peeling is, for example, low molecular weight alkoxide, alcohol, alkyl carbonate, cyclic ester, nitrile, amide or urea. The electrolyte is ionically conductive and is therefore capable of supporting ion diffusion of a salt solvated therein. The interface between each fixing member 5 and corresponding image pickup element 10 and the interface between each fixing member 5 and the base 2 are fixing regions. In FIG. 1A, the fixing regions are the same as the surface of each image pickup element 10. Each image pickup element 10 includes a semiconductor substrate 11 (for example, an N-type semiconductor substrate), a well region 12 (for example, a P-type well region), sensor portions 13, an N+ region 14 on the N-type semiconductor substrate, an N− region 15 on the N+ region, an insulating film 16, a conducting layer 17 on the N− region, microlenses 18, and another insulating film 19. The N-type semiconductor substrate is an N-type silicon substrate in this embodiment. The sensor portions 13 photoelectrically convert incident light. The conducting layer 17 forms wiring in the image pickup element 10 and a plurality of terminals 20 that are exposed on the surface of the image pickup element 10 to transfer signals to and from an external circuit. By the conducting layer 17, the N+ region 14, the N− region 15, and the semiconductor substrate 11, electricity can be conducted from the lower surface of the image pickup element 10 (on the side of the fixing member 5) to the upper surface of the image pickup element (on the side opposite to the fixing member 5). The insulating films 16 and 19 are desirably planarizing films for planarizing the surface of the image pickup element 10.

Next, a method for manufacturing an image pickup apparatus 1 will be described with reference to FIGS. 2A to 2E, which are schematic sectional views illustrating steps.

First, a base 2, a first adhesive 34 that forms fixing members, and image pickup elements 10 are prepared (not shown).

FIG. 2A shows the step of positioning, in which the image pickup elements 10 are disposed on a stage 25 by a conveying device 26. The stage 25 fixes the image pickup elements 10 by suction so that the image pickup elements 10 are not displaced. The arrows show suction.

Figure 2B:
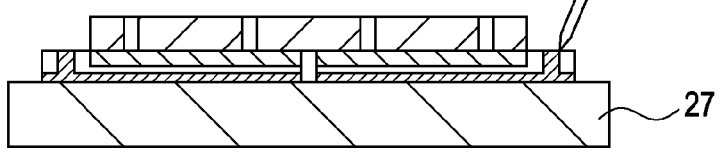

FIG. 2B shows the step of first inspection of the image pickup elements 10. If necessary, as shown, inspection is performed with the lower surfaces of the image pickup elements 10 in contact with another stage 27. Then, a probe 28 that is a part of an inspection device is brought into contact with each terminal of each image pickup element 10 to check whether each image pickup element 10 is defective at this time. If an image pickup element is defective, the image pickup element is replaced.

Figure 2C:
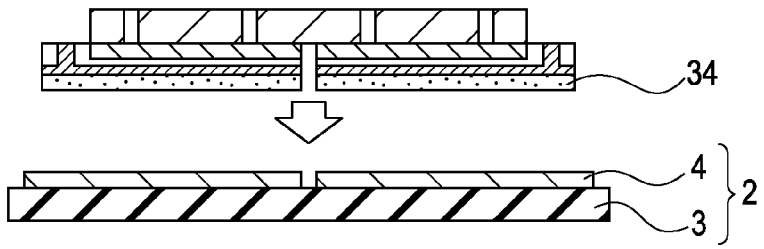

FIG. 2C shows the step of fixing, in which the image pickup elements 10 are bonded to the base 2 with the first adhesive 34 that forms fixing members. The first adhesive 34 that forms fixing members is a peelable resin containing an electrically disbonding material. In the figure, the first adhesive 34 that forms fixing members is applied to the image pickup elements 10. However, the first adhesive 34 that forms fixing members may be applied to the base 2. The term "fixing" in this specification includes, in addition to a configuration in which only a fixing member 5 is disposed between the base 2 and each image pickup element 10, a configuration in which another material that has electric conductivity is also disposed therebetween.

Figure 2D:
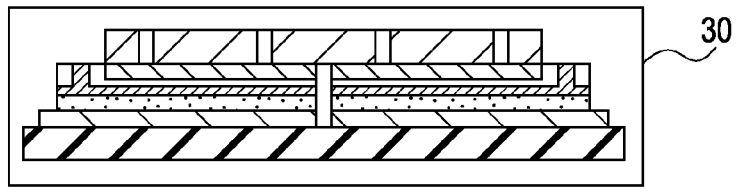

FIG. 2D shows the step of curing the first adhesive 34 that forms fixing members. The first adhesive 34 is a thermosetting adhesive containing, for example, epoxy resin and is thermally cured under a heated environment such as in an oven 30. In general, the curing temperature ranges from room temperature to 100° C., and the curing time ranges from 1 hour to 24 hours. The curing temperature is desirably 50 to 100° C.

Figure 2E:
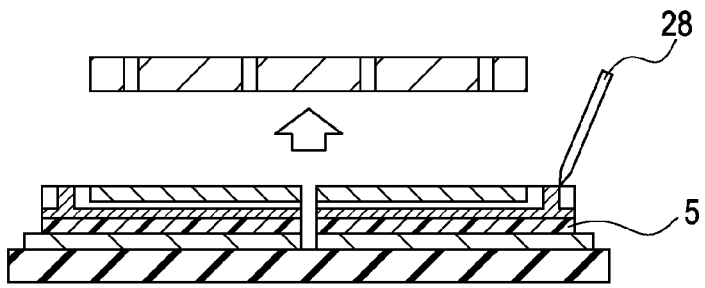

FIG. 2E shows the step of second inspection of the image pickup elements 10. It is checked whether each image pickup element 10 is defective at this time. If an image pickup element is determined to be defective, the image pickup element is replaced. If no defect is detected, an external circuit is connected to the terminals. The first adhesive in FIG. 2C is thermally cured by the heating shown in FIG. 2D and becomes cured adhesive, that is to say, forms fixing members 5.

Figure 3A:
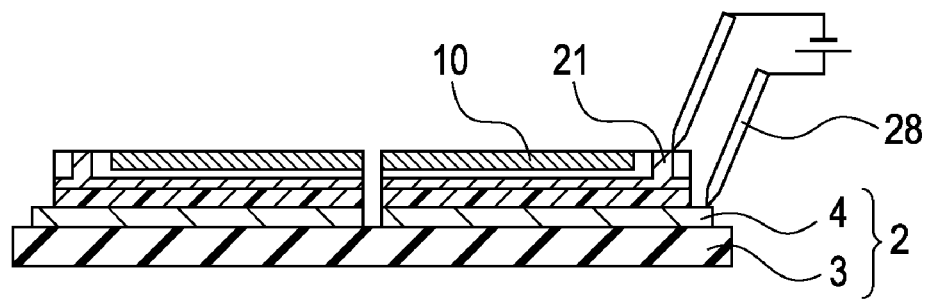
FIGS. 3A to 3C are sectional views showing a method for manufacturing an image pickup apparatus according to an embodiment of the present invention.
Figure 3B:
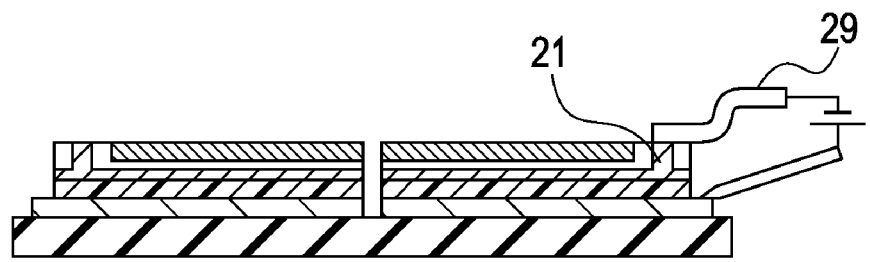
Figure 3C:
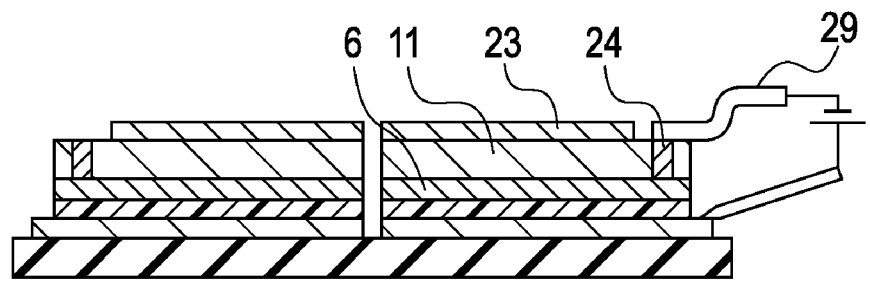

FIGS. 3A to 3C show the step of peeling an image pickup element 10 that is determined to be defective in the step of FIG. 2E. FIG. 3A shows a case where a voltage is applied to the base 2 and the image pickup element 10 using two probes 28. The case of FIG. 3B differs from the case of FIG. 3A in that a probe and a flexible printed circuit board (FPC) 29 are used. In each of the cases of FIGS. 3A and 3B, a voltage is applied in such a manner that the base 2 serves as a positive electrode and the image pickup element 10 serves as a negative electrode with an electric continuity portion 21 and a fixing member 5 therebetween. Electrochemical reactions occur at the interfaces between the fixing member 5 and adherends, and the bond on the side of the positive electrode is selectively weakened. Therefore, the image pickup element 10 and the fixing member 5 can be peeled from the surface of the base 2. Residues of the fixing member 5 do not remain on the surface of the base 2, and the image pickup element 10 and the fixing member 5 can be easily removed.

To perform the above-described peeling, the surface of the image pickup element 10 in contact with the fixing member 5 must be electrically conductive, and electricity must be conducted from this surface to the opposite surface of the image pickup element 10. Such a structure will be referred to as "electric continuity portion," which includes not only a specially provided configuration but also a configuration including a semiconductor substrate, a conducting layer, and so forth in a conventional image pickup element chip. In FIG. 1B, the electric continuity portion 21 corresponds to the conducting layer 17, the N-region 15, the N+ region 14, and the N-type semiconductor substrate 11. The N-type semiconductor substrate 11 functions as a conducting portion that is an electrode for electrically conducting with the fixing member. A structure on the surface of the image pickup element 10 on the side opposite to the fixing member 5 for electrically connecting the above-described "electric continuity portion" to the outside will be referred to as "terminal." The terminals 20 of the image pickup element 10 include a power source signal terminal, analog control signal terminal, scan signal terminal, and sensor operation control signal terminal for connecting the image pickup element 10 to the outside. Power source signals include plus power source, minus power source for bias, GND, and sensor reset power source. Analog control signals include current regulation. Scan signals include horizontal shift register clock and vertical shift register clock. Sensor operation control signals include chip select, sensor reset, sample hold, pixel addition selection bit. Any type of terminal 20 can be used for peeling the image pickup element 10. For example, by applying a high voltage to a sensor reset terminal for sensor operation control signals, for example, the PN junction in the image pickup element 10 shorts, and electricity can be conducted in the inside of the image pickup element 10. The conduction in the inside of the image pickup element is desirably performed using a typical power source signal, such as substrate bias power source or GND, for the electric continuity portion 21 to reduce the impact on other image pickup elements. The image pickup element 10 may have a dedicated terminal 20 that is not connected to an external circuit and is used only in the peeling step. The image pickup element 10 is connected to an external circuit using an FPC. However, another method such as wire bonding may be used.

The image pickup element 10 has a plurality of pixels each having a switch element and a sensor portion. Examples of the image pickup element 10 include a CMOS sensor, a CCD sensor, an amorphous silicon (hereinafter abbreviated to a-Si) sensor having pixels composed of a PIN-type or MIS-type sensor using a-Si and a TFT, and a SOI (Silicon on insulator) sensor. FIG. 3C shows an example of an a-Si sensor, which has sensor portions on an insulating substrate. Specifically, it has a glass substrate that serves as an insulating substrate 11, sensor portions on the glass substrate, a through electrode 24 provided on the periphery of the glass substrate, and a second conducting portion 6 provided on the lower surface of the glass substrate. The through electrode 24 serves as an electric continuity portion, and a voltage is uniformly applied to a plane by the second conducting portion 6. A voltage is desirably applied in such a manner that the through electrode serves as a negative electrode and the base serves as a positive electrode. Such a configuration enables the peeling of the image pickup element 10.

The area of the conducting portion of the base 2 is larger than the area of the fixing region between the fixing member and the base. Due to such a configuration, a voltage is applied to the bonding interface between the base and the fixing member, and the peeling is facilitated. The area of the conducting portion of the image pickup element is equal to or larger than the area of the fixing region between the fixing member and the image pickup element. The reason is that, for example, in the case where a plurality of image pickup elements share a fixing member, the image pickup elements are difficult to individually separate from the base together with the fixing member.

As described above, an image pickup apparatus having easily replaceable image pickup elements can be obtained. Since few residues of the fixing member remain on the surface of the base from which an image pickup element has been removed, another image pickup element can be easily fixed.

Figure 4A:
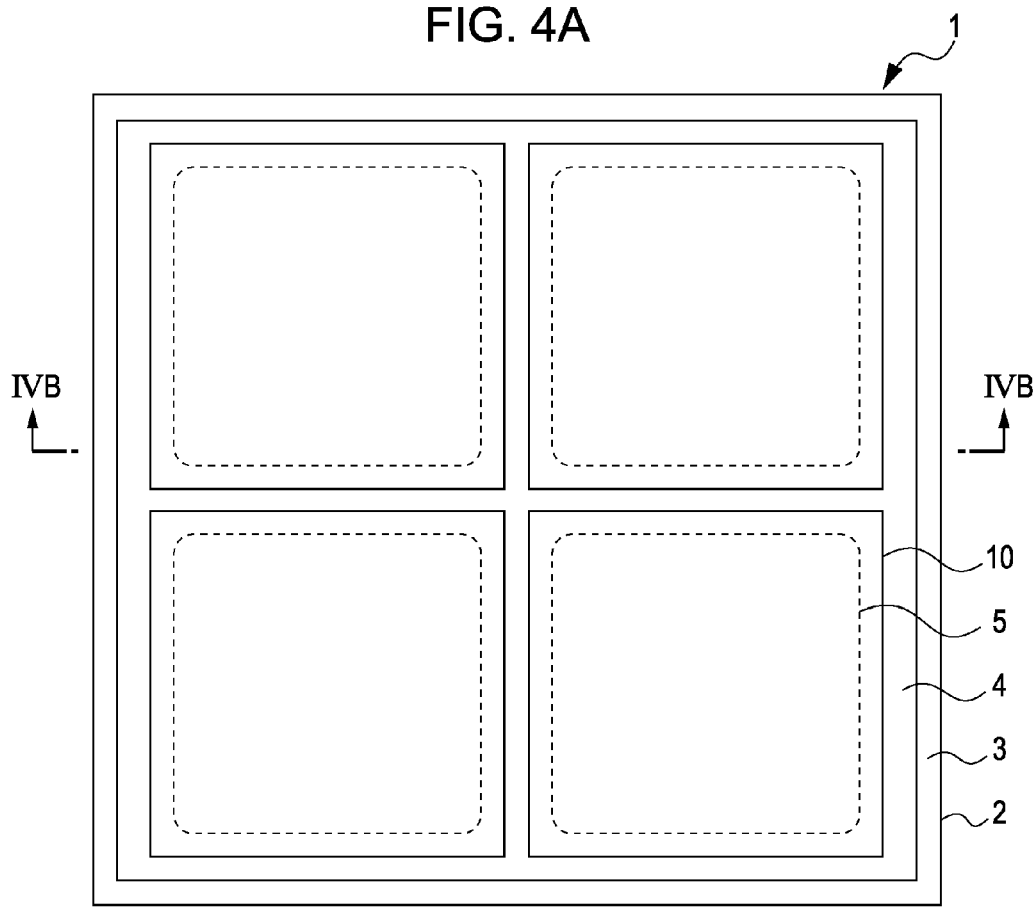
FIGS. 4A and 4B are a plan view and a sectional view, respectively, showing an image pickup apparatus according to an embodiment of the present invention.
Figure 4B:
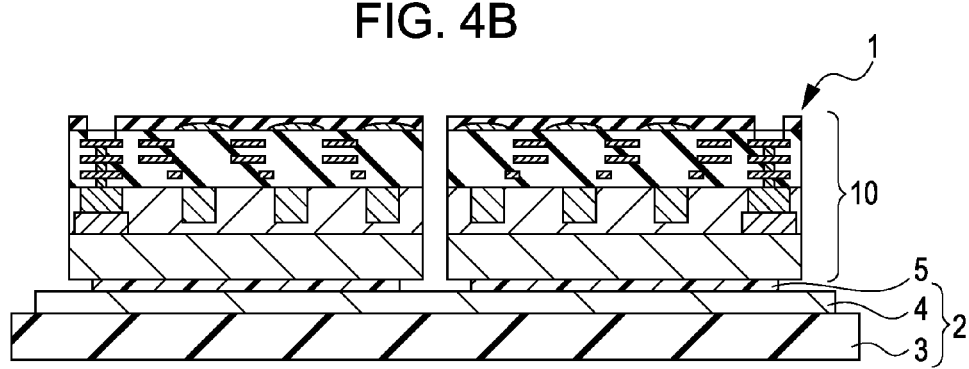

FIGS. 4A and 4B show an image pickup apparatus according to a second embodiment. FIG. 4A is a plan view of the image pickup apparatus, and FIG. 4B is a sectional view of the image pickup apparatus taken along line IVB-IVB of FIG. 4A.

The configuration of the image pickup apparatus 1 of FIGS. 4A and 4B differs from the configuration of FIGS. 1A and 1B in that the periphery of each fixing member 5 is within the periphery of corresponding image pickup element 10. In other words, the area of the fixing region between each fixing member and the conducting portion of corresponding image pickup element and the area of the fixing region between each fixing member and the base are each smaller than the area of the conducting portion of each image pickup element. In the case where each fixing member 5 is composed a plurality of dots, the periphery of a region occupied by the plurality of dots is within the peripheries of corresponding image pickup element and the base. If the area of the conducting portion of each image pickup element is too large compared to the area of the fixing region of corresponding fixing member, the image pickup elements are prone to be accidentally peeled. Therefore, the area of the conducting portion of each image pickup element is desirably not larger than twice the area of the fixing region of corresponding fixing member, and is more desirably not larger than 1.5 times the area of corresponding fixing member. The image pickup elements 10 are desirably placed on separate fixing members 5 so that each image pickup element 10 can be peeled together with corresponding fixing member 5. The configuration of FIGS. 4A and 4B further facilitates reliably peeling only an image pickup element to be peeled.

Figure 5A:
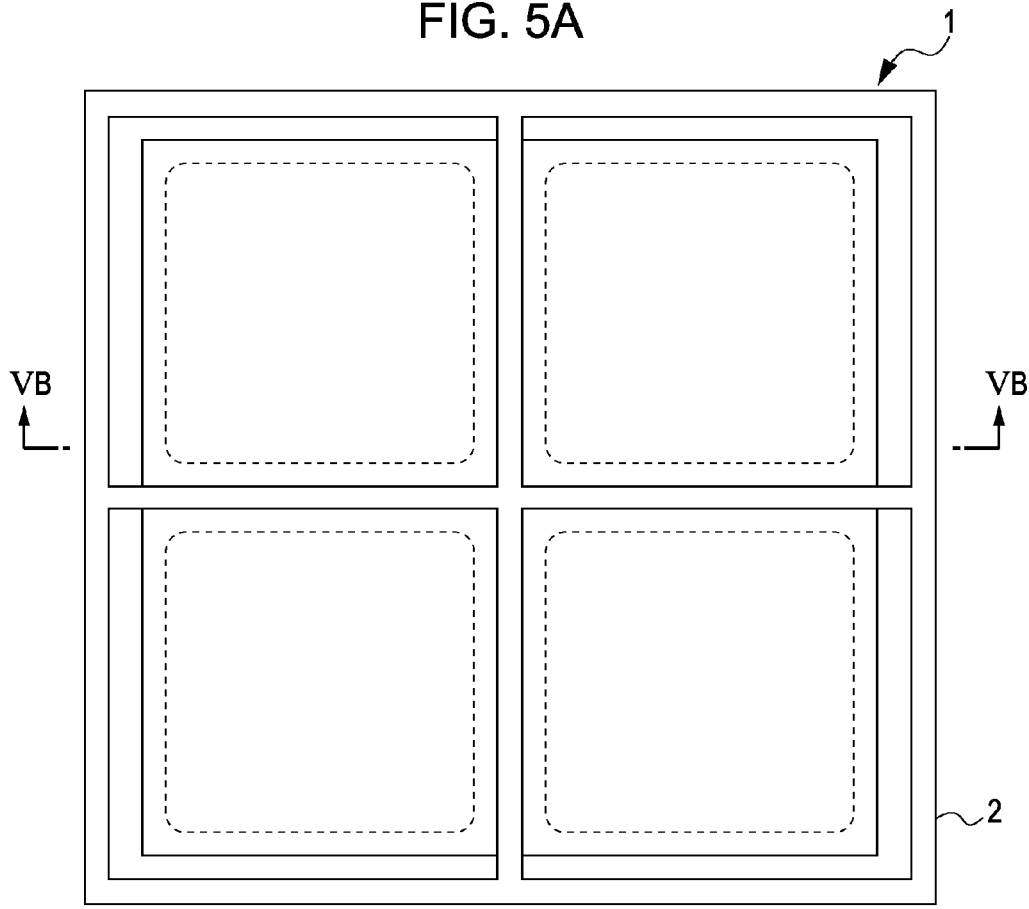
FIGS. 5A and 5B are a plan view and a sectional view, respectively, showing an image pickup apparatus according to an embodiment of the present invention.
Figure 5B:
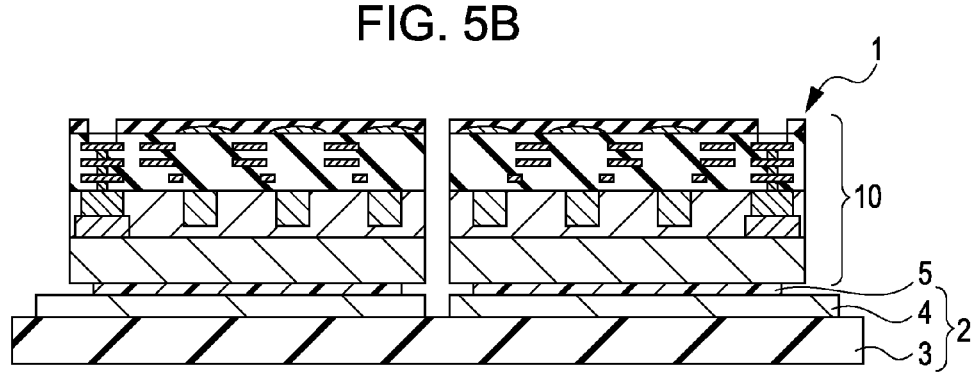

FIGS. 5A and 5B show a modification. FIG. 5A is a plan view of an image pickup apparatus, and FIG. 5B is a sectional view of the image pickup apparatus taken along line VB-VB of FIG. 5A. The configuration of the image pickup apparatus 1 of FIGS. 5A and 5B differs from the configuration of FIGS.

4A and 4B in that the base 2 has four separate conducting portions 4 corresponding to image pickup elements 10. Due to the configuration of FIGS. 5A and 5B, the voltage in the peeling step does not have an impact on image pickup elements other than an image pickup element to be peeled. This further facilitates reliably peeling only an image pickup element to be peeled.

Figure 6:
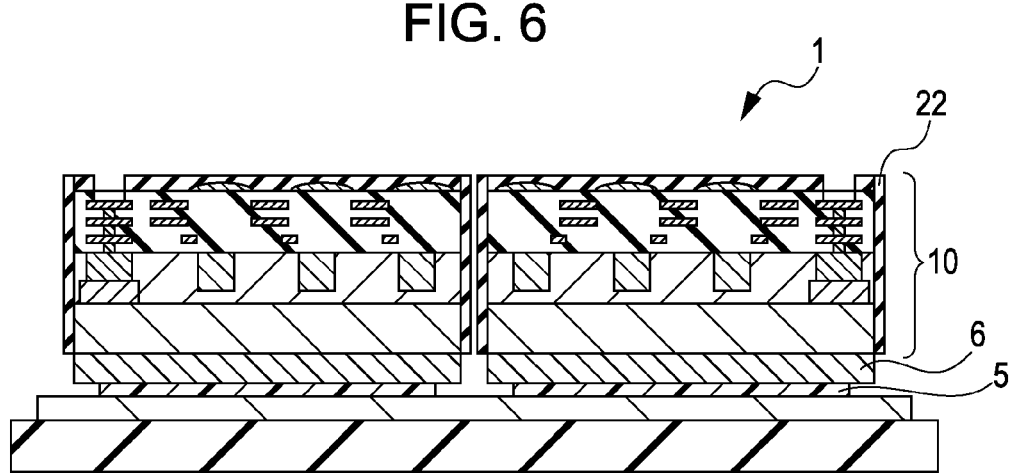
FIG. 6 is a sectional view showing an image pickup apparatus according to an embodiment of the present invention.

FIG. 6 shows a modification of the sectional view of the image pickup apparatus taken along line VB-VB of FIG. 5A.

The configuration of the image pickup apparatus 1 of FIG. 6 differs from the configuration of FIG. 5B in that a conducting portion 6 is disposed between each image pickup element 10 and corresponding fixing member 5 and that adjacent image pickup elements 10 have insulating portions 22 on their side surfaces. The conducting portion 6 is desirably made of aluminum or molybdenum. The voltage applied to a terminal 20 decreases due to the resistance in the plane direction of the image pickup element 10. Such a decrease in voltage is reduced by the conducting portion 6. Therefore, the potential difference in the plane of the image pickup element 10 is reduced, and the unevenness of voltage applied to the fixing member 5 can be reduced. In addition, the conducting portion 6 can prevent the diffusion of alkali metals (for example, sodium and potassium) contained in the fixing member 5. Therefore, the conducting portion 6 is desirably disposed on the overall surface of the image pickup element on the side of the fixing member.

The insulating portions 22 are inorganic films, for example, of $SiO_2$, SiON, or $Si_3N_4$ formed, for example, by CVD, PVD, or application, or organic films, for example, of polyimide resin or epoxy resin formed, for example, by application and thereafter thermally curing. Due to such a configuration, the image pickup elements 10 are electrically insulated from each other. If an electrically conductive foreign substance is trapped between the image pickup elements 10, image pickup elements that need not be peeled are not accidentally peeled. Therefore, the workability is improved.

Figure 7:
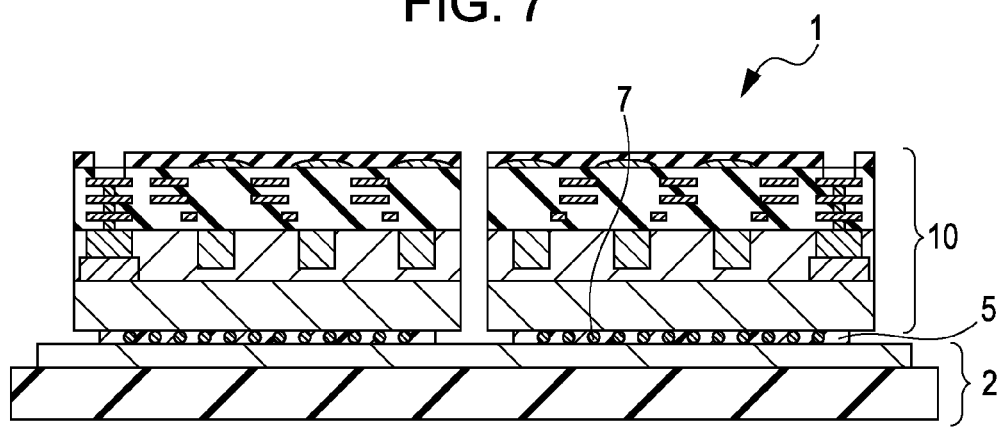
FIG. 7 is a sectional view showing an image pickup apparatus according to an embodiment of the present invention.

FIG. 7 shows a modification of the sectional view of the image pickup apparatus taken along line VB-VB of FIG. 5A.

The configuration of the image pickup apparatus 1 of FIG. 7 differs from the configuration of FIG. 5B in that each fixing member 5 contains insulating spacers 7. Due to such a configuration, the distance between each image pickup element 10 and the base 2 is maintained constant, and the positional precision is improved. In addition, the image pickup elements 10 are prevented from being accidentally coming into contact with the base 2 and being bonded thereto in the manufacturing process, and the image pickup elements 10 can be individually peeled.

Figure 8:
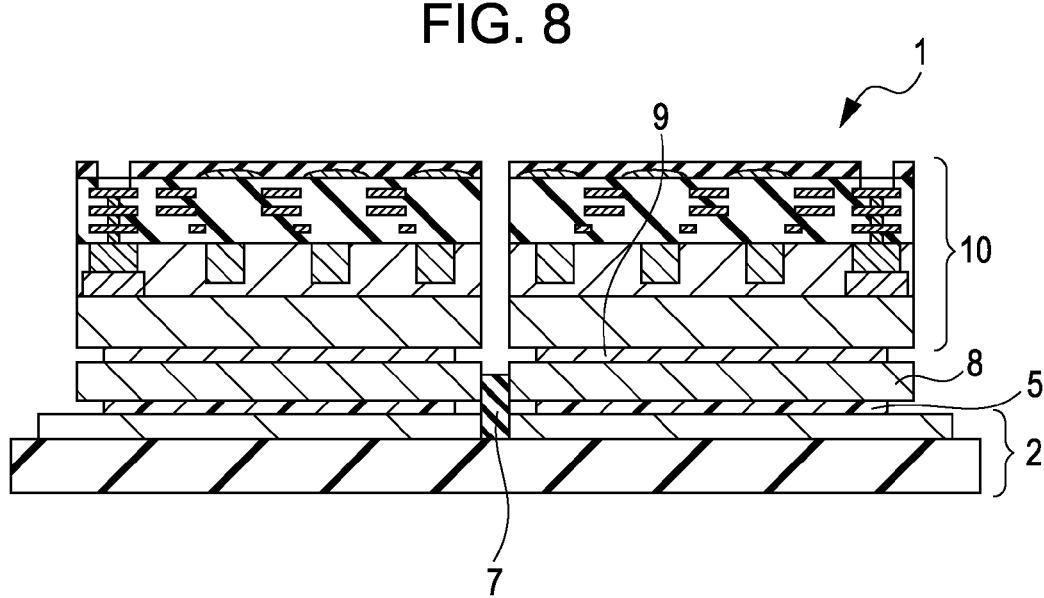
FIG. 8 is a sectional view showing an image pickup apparatus according to an embodiment of the present invention.

FIG. 8 shows another modification, in which each image pickup element 10 is fixed to a support substrate 8 with a second fixing member 9, and the support substrate 8 is fixed to the base 2 with a first fixing member 5. By bringing the support substrate 8 into contact with a spacer 7, the positional precision is easily improved. The support substrates 8 and the second fixing members 9 have electric conductivity. The spacer 7 is disposed between adjacent image pickup elements so that the image pickup elements are insulated from each other. For this purpose, the spacer 7 has electrical insulation property. However, part of the spacer 7 may have electric conductivity as long as the spacer 7 can insulate adjacent image pickup elements from each other. The spacer 7 may be integrated with the insulating plate 3 of the base 2. In this case, it can also be said that the insulating plate 3 has a projection corresponding to regions between adjacent image pickup elements. The term "integrated" means that when the insulating plate 3 is made, for example, of resin, the insulating plate 3 is formed not by bonding two members together but by injection molding or grinding a rectangular parallelepiped plate. When new image pickup elements are lowered so as to be fixed to the base 2, the spacer 7 desirably taper from the base 2 toward the image pickup elements 10. In addition, the support substrates 8 also desirably taper so as to fit the spacer 7. Such a configuration improves the positional precision and facilitates peeling and attaching.

Figure 9:
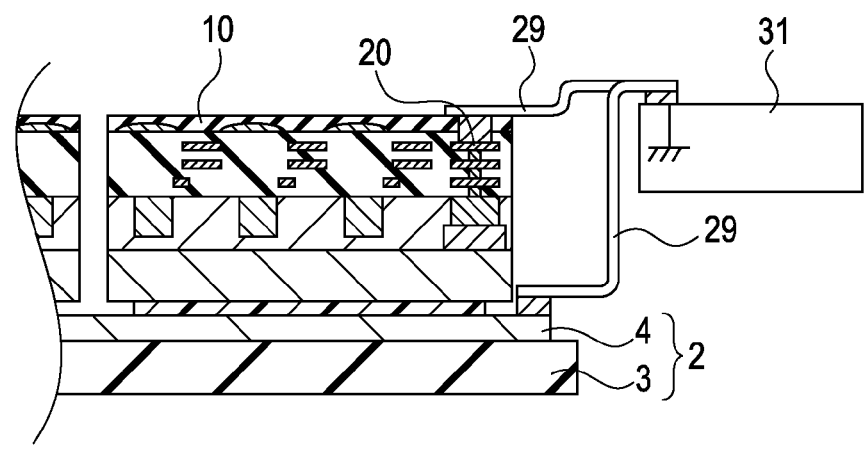
FIG. 9 is a sectional view showing an image pickup apparatus according to an embodiment of the present invention.

In an image pickup apparatus according to a fourth embodiment, as shown in FIG. 9, the terminals 20 of the image pickup element 10 and the conducting portion 4 are placed at GND potential. In the image pickup apparatus 1 of FIG. 9, the terminal 20 of the image pickup element 10 and the conducting portion 4 are each connected through an FPC 29 to a GND terminal of an external circuit 31.

By placing the terminal 20 of the image pickup element 10 and the conducting portion 4 at the same potential as described above, the first adhesive can be prevented from being accidentally peeled, for example, due to static electricity during use of the product.

A fifth embodiment is a radiation image pickup apparatus that has a scintillator. If it is determined that there is no defective image pickup element in the inspection step, it is desirable to fix the conducting portions of the base and the image pickup elements at a common potential in a potential equalizing step so that the base and each image pickup element do not separate from each other.

Figure 10A:
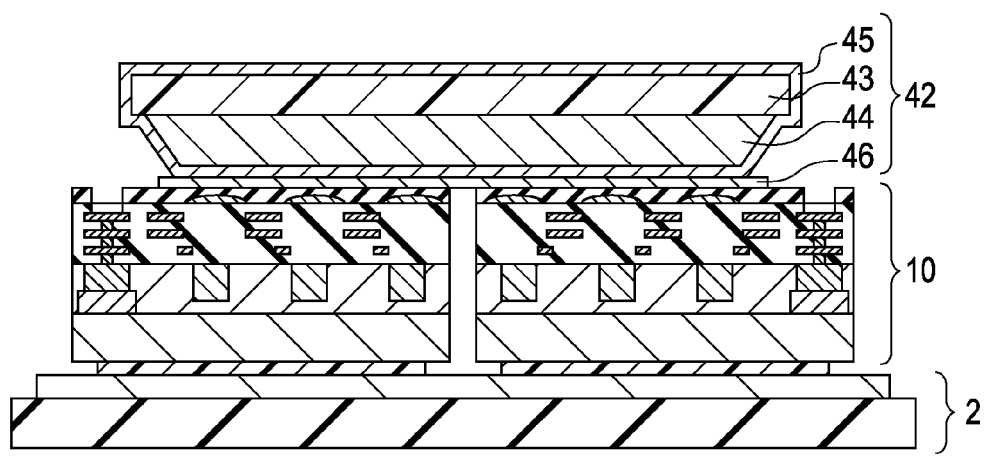
FIGS. 10A and 10B are sectional views showing a radiation image pickup apparatus according to an embodiment of the present invention.

In the radiation image pickup apparatus of FIG. 10A, a scintillator panel 42 is disposed on image pickup elements 10. The scintillator panel 42 has a substrate 43 that is made, for example, of aluminum, carbon, or resin, a scintillator 44 that converts radiation into light, and a protective layer 45 for the scintillator 44. The scintillator panel 42 is fixed to the image pickup elements 10 with a scintillator fixing member 46. In the figure, an adhesive that forms the scintillator fixing member 46 is applied to the image pickup elements 10, and the scintillator panel 42 is fixed therewith. However, the scintillator panel 42 may be mechanically fixed directly to the image pickup elements 10.

Figure 10B:
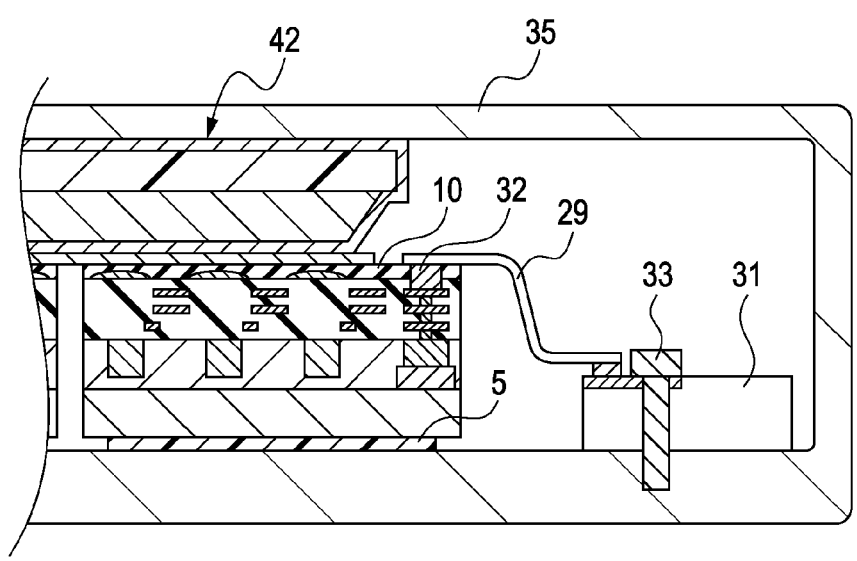

In the radiation image pickup apparatus of FIG. 10B, image pickup elements 10 are fixed to an electrically conductive case 35 that serves as a base 2, each image pickup element 10 is connected to an external circuit 31 by an FPC 29, and the external circuit 31 is fixed to the case 35 with an electrically conductive fixing device 33 that is made, for example, of metal.

In this embodiment, an indirect radiation image pickup apparatus is described that includes: a scintillator on which light is incident and that emits light; and image pickup elements that each has sensor portions that perform photoelectric conversion. However, the present invention is also applicable to a radiation image pickup apparatus that directly converts radiation into charge, for example, using a-Se (amorphous selenium).

By placing the terminal 20 of the image pickup element 10 and the case 35 at the same potential as described above, the fixing members that fix the image pickup elements to the case can be prevented from being accidentally peeled, for example, due to static electricity, for example, during use of the product.

When an image pickup apparatus or a radiation image pickup apparatus is reused or scrapped, image pickup elements that can operate properly are reused. Image pickup elements that can operate properly must be peeled so as not to be destroyed, for example, by static electricity.

Figure 11:
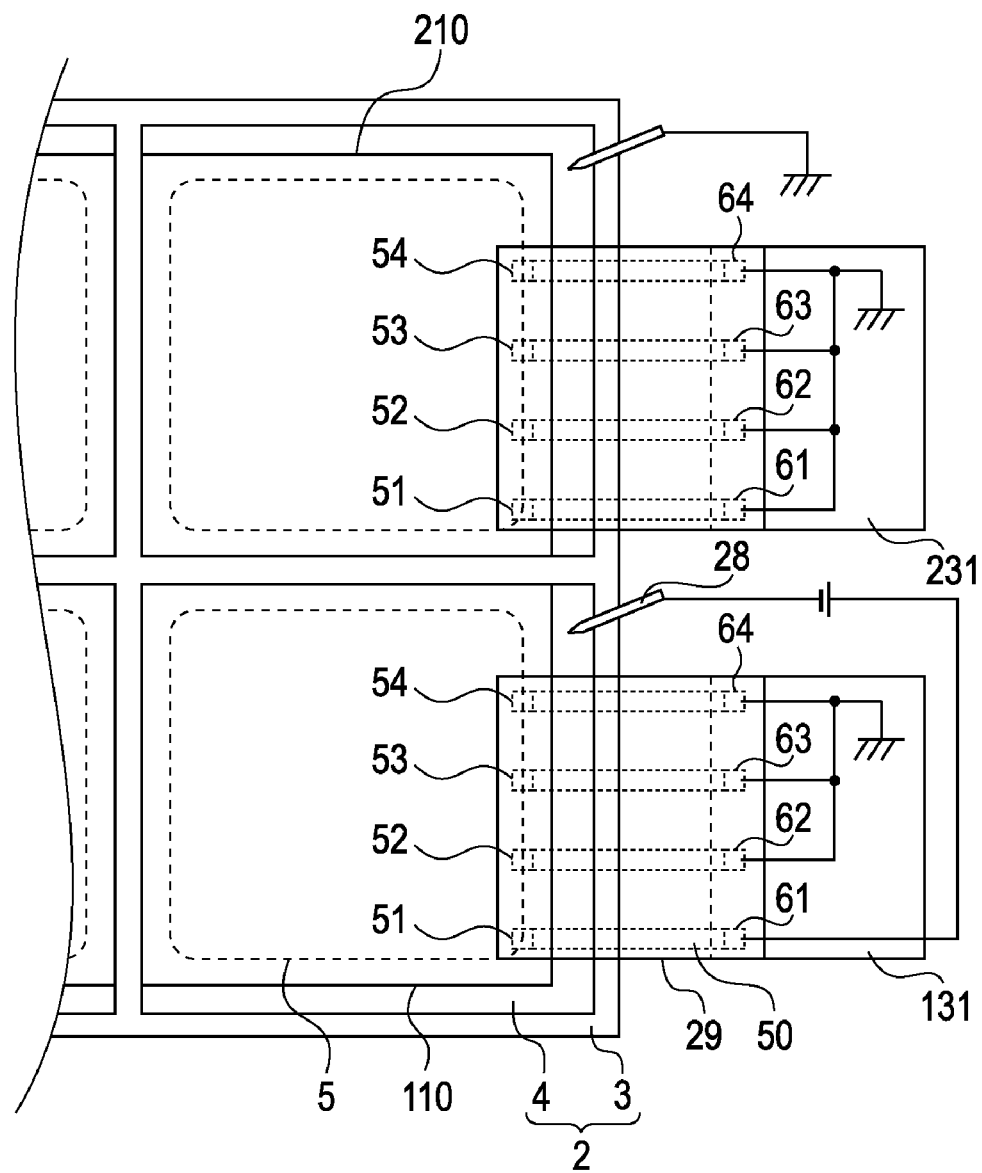
FIG. 11 is a plan view showing a method for manufacturing an image pickup apparatus according to an embodiment of the present invention.

FIG. 11 is a plan view of an image pickup apparatus illustrating the peeling step in which the case is preliminarily taken apart to expose the image pickup elements, and image pickup elements to be reused in another image pickup apparatus are separated from the base. An image pickup apparatus of a fifth embodiment has a configuration in which an external circuit is connected through an FPC to each image pickup element of the image pickup apparatus of FIGS. 5A and 5B. The base 2 has an insulating substrate 3 and conducting portions 4 disposed on the insulating substrate 3. The image pickup elements 110 and 210 each correspond to one of the conducting portions 4 and are each fixed to the base 2 with a fixing member 5 therebetween. The image pickup elements 110 and 210 are electrically connected to corresponding external circuits 131 and 231, respectively, through FPCs 29. The terminal 51 is a ground input terminal corresponding to the terminal 61; the terminal 52 is a power supply voltage input terminal corresponding to the terminal 62; the terminal 53 is a clock pulse input terminal corresponding to the terminal 63; and the terminal 54 is an image signal output terminal corresponding to the terminal 64. The omitted image pickup elements on the left side of the figure also have the same configuration. In FIG. 11, the image pickup elements 110 are being peeled. A voltage is applied between the terminal (ground input terminal) and the conducting portion 4. Terminals of the image pickup element 110 other than the terminal 51 (ground input terminal) are placed at ground potential in order to protect the circuit in the image pickup element 110 from the voltage for peeling or an excessive voltage such as static electricity. Terminals 51, 52, 53, and 54, that is to say, all terminals of the image pickup elements 210 and the conducting portion 4 corresponding to the image pickup elements 210 are placed at ground potential in order to protect the circuit in the image pickup element 210 from the voltage for peeling or an excessive voltage such as static electricity. To apply a voltage so that an image pickup element is not destroyed, a power source is desirably connected to the terminal in a corner of the image pickup element. The reason is that the terminal is away from the circuits such as an amplifier and an A/D converter in the image pickup element.

Figure 12:
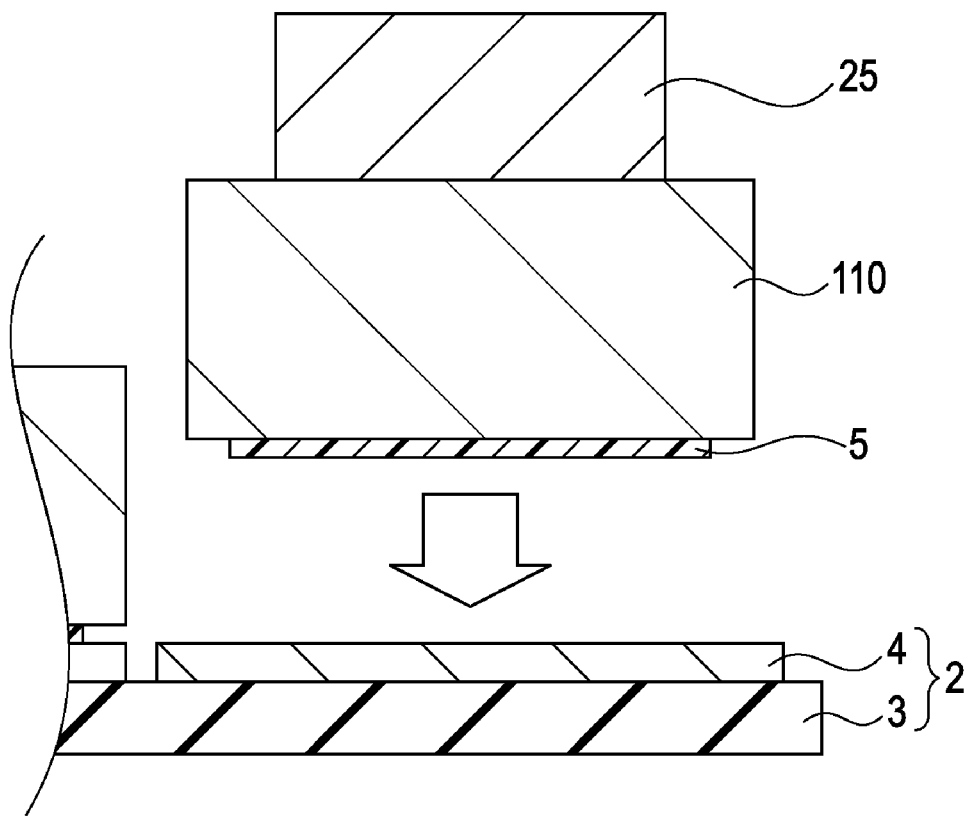
FIG. 12 is a sectional view showing a method for manufacturing an image pickup apparatus according to an embodiment of the present invention.

FIG. 12 shows the step of fixing an image pickup element that has been separated in the peeling step, to a new base. A removed image pickup element 110 that can operate properly is sucked by a stage 25, and an adhesive that forms a fixing member 5 is applied to the image pickup element 110. Thereafter, while being aligned, the image pickup elements 110 are disposed on a conducting portion 4 of a base 2. Thereafter, as described in the first embodiment, the step of inspecting each image pickup element is performed, each image pickup element is connected to an external circuit by an FPC, and the image pickup elements are housed in a case. If an image pickup element is determined to be defective in the inspection step, the defective image pickup element is separated from the base, and a new image pickup element is attached.

As described above, when image pickup elements of an image pickup apparatus are reused, the image pickup elements can be easily separated from the base.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-324401 filed Dec. 19, 2008, which is hereby incorporated by reference herein in its entirety.

What is claimed is:

1. An image pickup apparatus comprising:
a base;
an image pickup element; and
a fixing member fixing the image pickup element to the base,
wherein the base has a conducting surface on a side of the fixing member, and the image pickup element has a conducting portion on a surface thereof on a side of the fixing member,
wherein the fixing member is formed of peelable resin for separating the image pickup element from the base by applying current, and
wherein an area of the conducting portion of the base is larger than an area of a fixing region between the fixing member and the base.

2. The image pickup apparatus according to claim 1, wherein the area of the conducting portion of the image pickup element is equal to or larger than the area of the fixing region between the fixing member and the image pickup element but not larger than twice the area of the fixing region between the fixing member and the image pickup element.

3. The image pickup apparatus according to claim 1, wherein the separation is caused by a decrease in the strength of the fixing interface caused by the oxidation-reduction reaction caused by the current.

4. The image pickup apparatus according to claim 1, wherein the image pickup element comprises a plurality of image pickup elements, and the fixing member comprises a plurality of fixing members corresponding to the plurality of image pickup elements.

5. The image pickup apparatus according to claim 4, wherein the base has an insulating plate, the conducting portion of the base comprises a plurality of conducting portions corresponding to the plurality of image pickup elements, and the plurality of conducting portions are insulated from each other.

6. The image pickup apparatus according to claim 4, further comprising a spacer that has electrical insulation property between every adjacent two of the plurality of image pickup elements.

7. The image pickup apparatus according to claim 6, wherein the base has an insulating plate, and the spacer is integrated with the insulating plate of the base.

8. The image pickup apparatus according to claim 4, wherein each of the plurality of image pickup elements has an insulating portion on every side surface facing an adjacent one of the plurality of image pickup elements.

9. The image pickup apparatus according to claim 1, wherein the image pickup element has a semiconductor substrate and an electric continuity portion that conducts electricity from the surface of the image pickup element on the side of the fixing member to an opposite surface.

10. The image pickup apparatus according to claim 9, wherein the electric continuity portion of the image pickup element has an N-type semiconductor substrate, an N+ region on the N-type semiconductor substrate, an N− region on the N+ region, and a conducting layer on the N− region.

11. The image pickup apparatus according to claim 9, further comprising another conducting portion on the fixing member side of the semiconductor substrate of the image pickup element.

12. The image pickup apparatus according to claim 1, wherein the image pickup element has an insulating substrate, sensor portions disposed on the insulating substrate, an electric continuity portion that conducts electricity from a surface of the insulating substrate on the side of the fixing member to an opposite surface, and another conducting portion disposed on the surface of the insulating substrate on the side of the fixing member.

13. A method for manufacturing an image pickup apparatus, the method comprising:
preparing a base that has a conducting surface;
preparing an image pickup element that has a conducting portion on a surface thereof;
applying peelable resin for separating adherend by applying current to the conducting surface of the base or the conducting portion of the image pickup element;
fixing the image pickup element to the base with the peelable resin therebetween, wherein an area of the conducting portion of the base is larger than an area of a fixing region between the fixing member and the base;
inspecting the image pickup element fixed to the base; and
if the image pickup element is determined to be defective in the inspecting step, applying a voltage between the base and the defective image pickup element and peeling the defective image pickup element from the base.

14. The method according to claim 13, wherein in the peeling step, a voltage is applied in such a manner that the base serves as a positive electrode and the defective image pickup element serves as a negative electrode.

15. The method according to claim 13, wherein the image pickup element has a plurality of terminals for transferring signals to and from an external circuit, the plurality of terminals including a ground input terminal, and
wherein in the peeling step, a voltage is applied in such a manner that the ground input terminal serves as a negative electrode and the base serves as a positive electrode, and the other terminals are placed at ground potential.

16. A method for manufacturing an image pickup apparatus, the method comprising:
preparing a base that has a conducting surface;
preparing an image pickup element that has a conducting portion on a surface thereof;
applying peelable resin for separating adherend by applying current to the conducting surface of the base or the conducting portion of the image pickup element;
fixing the image pickup element to the base with the peelable resin therebetween, wherein an area of the conducting portion of the base is larger than an area of a fixing region between the fixing member and the base;
inspecting the image pickup element fixed to the base; and
if the image pickup element is determined to be defective in the inspecting step, applying a voltage between the base and the defective image pickup element and peeling the defective image pickup element from the base, and if it is determined that there is no defective image pickup element in the inspection step, fixing the conducting surface of the base and the conducting portions the image pickup element at a common potential.

* * * * *